Patented Dec. 30, 1952

2,623,826

UNITED STATES PATENT OFFICE 2,623,826

VACUUM PACKAGING OF MEAT

Sanford R. Grinstead, Whiting, Ind., assignor to Swift & Company, Chicago, Ill., a corporation of Illinois No Drawing. Application July 11, 1949, Serial No. 104,149

5 Claims. (Cl. 99—174)

This invention relates to a method of packaging meat products, and more particularly to a method of packaging meat products in a pliable, flexible container under partial vacuum and in the presence of an inert gas.

Attempts have been made in the past to vacuum package meat products in pliable, flexible containers and thereby obtain improved keeping qualities of the meat. However, such packages have not been satisfactory. For example, sliced, dried beef when packaged in a transparent, pliable, flexible container under complete vacuum has an artificial blood-red color which is distasteful to consumers. In addition, the atmospheric pressure bearing on the sliced, dried beef squeezes the moisture therefrom and causes the slices to block together. When the product is sealed in an atmosphere of an inert gas at atmospheric pressure, the bag has a ballooned appearance.

Therefore, it is an object of this invention to provide an improved method of packaging meat products.

Another object of this invention is to provide a method of vacuum packaging meat products in such a manner that the natural odor and color thereof are retained for a long period of time.

A further object is to provide a packaged meat product which has an attractive appearance.

Additional objects, not specifically disclosed herein, will be apparent to one skilled in the art from the following detailed description of the invention:

In general, the method of this invention comprises exhausting the air from a pliable, flexible container having a meat product therein, partially replacing the displaced air with an inert gas, and thereafter sealing the said pliable, flexible container.

More specifically, in the preferred method of carrying out this invention, a pliable, flexible bag or pouch of heat-sealable material is used, said bag or pouch containing the meat product to be packaged. The flexible container having the meat product therein is then placed in a vacuum chamber or the like and a high degree of vacuum drawn thereon. The air removed from the flexible container and meat product is then partially replaced with an inert gas, said gas being admitted until a predetermined degree of vacuum is reached. The flexible container is then heat sealed and thereafter removed from the vacuum chamber. Although a vacuum chamber has been found to be the most satisfactory means for carrying out the vacuumizing and back-filling steps of this invention, it is not desired to limit the means thereto. The steps may be carried out by the use of other means, such as withdrawing the air and back-filling with inert gas through a valve provided in the flexible, pliable container or through the use of any other suitable means.

The material from which the flexible container used in this process is made must be impervious to air and moisture vapor. There are a number of commercially available, transparent, thermoplastic films on the market which are satisfactory for use in this method. Although, as has been set forth above, the preferred method of sealing the package produced by this invention is heat sealing, it is not desired to restrict the scope of the invention to any one type of sealing means or sealable material. In addition to the materials described herein as being especially adapted for the preferred form of carrying out the invention, it is also possible to obtain good results using other pliable, flexible containers capable of being sealed by the application of pressure only. In a like manner a satisfactory seal may be formed by the application of a suitable adhesive to the edges of the container to be sealed.

The inert gas which is admitted to the package to take the place of part of the displaced air is preferably oxygen-free nitrogen, although other inert, oxygen-free gases may be satisfactory.

While the specific embodiment of this invention hereinafter described relates to the packaging of sliced, dried beef, this is for the purpose of illustration only and is not to be construed as a limitation upon the scope of the invention since obviously other meat products may be so packaged.

Sliced, dried beef is placed in a bag fabricated from a transparent, thermoplastic film, said film being impervious to air and moisture vapor. The bag and the product contained therein are then inserted in a vacuum chamber wherein a vacuum of about 28 inches of mercury is drawn. This vacuum results substantially in complete removal of all air or other gases contained in the bag or in the pores of the product itself. Because the vacuum gauge reading when the air is removed from the vacuum chamber depends on the atmospheric pressure, such a reading may vary considerably from time to time and between different geographical locations. Since the important step here is to substantially completely evacuate all air from the container, the degrees of vacuum set forth herein are merely illustrative of the process, and it is not intended to limit it thereto. The vacuum chamber is then connected to a source of an inert, oxygen-free gas, such as nitrogen of the commercial oxygen-free variety. This inert gas is allowed to flow into the vacuum chamber until the vacuum therein reaches a predetermined degree which, for example, may be around 10 inches of mercury.

When the desired degree of partial vacuum is reached, the bag is sealed. The sealing means does not form a part of this invention and will not be discussed in any detail. However, any conventional means known to the art may be employed in effecting the seal of the bag, such as by contact heating or by electronic heating. The bag and enclosed product are now removed from the vacuum chamber in a suitable condition to ship or store without any danger of deterioration of the natural odor or color of the product.

The controlling factor in the appearance of the finished package produced by the method of this invention is the "back-filling" to a controlled vacuum. By "back-filling" is meant the step of admitting an inert gas to the vacuum chamber and controlling the quantity of such gas admitted by the degree of vacuum remaining in the chamber. As pointed out above, to admit the nitrogen under atmospheric pressure, or until the pressure within the bag and chamber is the same as atmospheric pressure, will result in a ballooned appearance of the finished package. By controlling the amount of nitrogen admitted to the bag, an attractive package of the desired type is produced. Such a package will adhere closely to the meat product contained therein due to the pressure differential between the partial vacuum within the package and the atmospheric pressure on the outside. At the same time, by controlling the "back-filling" step to the desired degree as herein disclosed, the pressure differential is not so great as to cause blocking, artificially enhanced coloring, or other undesirable characteristics of meat products packaged under complete or uncontrolled vacuum. The degree of partial vacuum to which the bag and chamber are back-filled in order to produce such a package, is dependent upon the size of the bag relative to the quantity of product contained therein. The tighter the bag fits the product, the less the degree of partial vacuum within the bag is required. For example, with a bag containing a relatively small amount of product, that is, with considerable space between the product and the sides of the bag, the controlled degree of partial vacuum to which the bag would be back-filled would be around 10 inches of mercury. Whereas, if the bag contained a relatively large amount of product and was more or less tight fitting prior to vacuum treatment, the controlled degree of partial vacuum to which the bag would be back-filled would be less, being in the neighborhood of around 5 inches of mercury. It is obvious that if the controlled degree of partial vacuum is less, then the relative amount of nitrogen or other inert gas present in the bag is greater. Because the bag is flexible and pliable, the nitrogen which is entrapped in the bag by the heat sealing of the bag subsequent to the above-mentioned back-filling is at atmospheric pressure when the bag is removed from the vacuum chamber. That is, the walls of the bag will be collapsed when the bag is removed from the chamber, and the nitrogen contained within the said bag will thereby be compressed to the point where the inside pressure is equal to the atmospheric pressure on the outside. This controlled partial vacuum within the bag therefore allows a package to be produced in which the walls thereof will adhere closely to the product, presenting an attractive appearance, and at the same time preventing the squeezing or blocking of the slices of meat product together which would result when and if a complete vacuum were present within the sealed bag. Likewise, the use of the partial vacuum method of packaging meat products discolsed herein prevents deterioration or loss of the natural odor and color of the product during storage by reason of the oxygen-free atmosphere within the bag, and at the same time prevents the formation of the artificial, blood-red color which results when a complete vacuum is present within the bag. In addition to the above improved results obtained when the method of this invention is applied to the packaging of meat products, the danger of breaking a ballooning bag or package is avoided by controlling the amount of inert gas entrapped in the container.

The term "meat products" as used in the claims is intended to cover any meats or meat compositions which can be kept in a vacuum package, including sterilized, fresh, or cooked meats, and cured meats, such as sliced dried beef, corned beef, smoked beef tongues, or the like.

Obviously, many modifications and variations of the invention as hereinbefore set forth may be made without departing from the spirit and scope thereof, and therefore only such limitations should be imposed as are indicated in the appended claims.

I claim:

1. A process of packaging meat products comprising placing the product in a pliable, flexible container, subjecting the container and product to a high degree of vacuum, back-filling the bag to a lower, controlled degree of partial vacuum with an inert gas, and thereafter sealing the bag while it is subjected to the said partial vacuum.

2. In a process of vacuum packaging meat products in pliable, flexible containers, the step of back-filling the container to a controlled degree of partial vacuum with an inert gas.

3. A process of packaging meat products selected from the group consisting of corned beef, smoked beef tongues, and sliced dried beef, comprising placing the product in a pliable, flexible container, subjecting the container and product to a vacuum of about 28 inches of mercury, back-filling the container to a controlled degree of partial vacuum between 5 and 10 inches of mercury with an inert gas, and thereafter sealing the container while it is subjected to the said partial vacuum.

4. A process as in claim 3 wherein the inert gas is nitrogen.

5. A process for packaging sliced, dried beef which comprises placing the sliced, dried beef in a pliable, flexible, heat-sealable container; subjecting the container and the sliced, dried beef to a vacuum of around 28 inches of mercury; back-filling the container to a controlled degree of partial vacuum between 5 and 10 inches of mercury with oxygen-free nitrogen; and thereafter heat sealing the container while it is subjected to the said partial vacuum.

SANFORD R. GRINSTEAD.

REFERENCES CITED

The following references are of record in the file of this patent:

UNITED STATES PATENTS

| Number | Name | Date |
|---|---|---|
| 1,789,946 | Rector | Jan. 20, 1931 |
| 1,863,355 | Schibsted | June 14, 1932 |
| 2,188,700 | Bassett | Jan. 30, 1940 |
| 2,281,187 | Waters | Apr. 28, 1942 |
| 2,528,832 | Johnson | Nov. 7, 1950 |